US008065068B2

(12) United States Patent
Kawai

(10) Patent No.: US 8,065,068 B2
(45) Date of Patent: Nov. 22, 2011

(54) VEHICLE CONTROL METHOD AND VEHICLE CONTROL DEVICE

(75) Inventor: Keisuke Kawai, Odawara (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 194 days.

(21) Appl. No.: 12/452,325

(22) PCT Filed: Apr. 1, 2008

(86) PCT No.: PCT/JP2008/056456

§ 371 (c)(1), (2), (4) Date: Dec. 24, 2009

(87) PCT Pub. No.: WO2009/025100

PCT Pub. Date: Feb. 26, 2009

(65) Prior Publication Data

US 2010/0138077 A1 Jun. 3, 2010

(30) Foreign Application Priority Data

Aug. 21, 2007 (JP) ................................ 2007-215034

(51) Int. Cl.
*F02D 45/00* (2006.01)
*F02D 43/00* (2006.01)
*B60R 16/02* (2006.01)

(52) U.S. Cl. ......................................... 701/102; 701/48

(58) Field of Classification Search ........................ None
See application file for complete search history.

(56) References Cited

U.S. PATENT DOCUMENTS

| | | | | |
|---|---|---|---|---|
| 6,920,865 | B2 * | 7/2005 | Lyon | 123/399 |
| 7,096,106 | B2 * | 8/2006 | Krenn et al. | 701/54 |
| 2004/0014561 | A1 | 1/2004 | Jessen | |
| 2006/0218898 | A1 * | 10/2006 | Satou et al. | 60/285 |
| 2007/0257627 | A1 * | 11/2007 | Palandre et al. | 318/432 |

FOREIGN PATENT DOCUMENTS

| | | | |
|---|---|---|---|
| JP | 2000-220509 | * | 8/2000 |
| JP | A-2004-052769 | | 2/2004 |
| JP | A-2004-263633 | | 9/2004 |
| JP | A-2005-113877 | | 4/2005 |
| JP | A-2005-299553 | | 10/2005 |

OTHER PUBLICATIONS

International Search Report issued in International Application No. PCT/JP2008/056456 on May 1, 2008.
International Preliminary Report on Patentability issued in International Application No. PCT/JP2008/056456 on Jun. 25, 2009.

* cited by examiner

*Primary Examiner* — Michael J. Zanelli
(74) *Attorney, Agent, or Firm* — Oliff & Berridge, PLC

(57) ABSTRACT

This invention is intended to ensure that a vehicle control method or vehicle control device is capable of achieving the object of each of a plurality of control logics in a balanced manner and performing an appropriate control for the vehicle as a whole. Demands concerning a plurality of control parameters of a vehicle are output from each of a plurality of control logics having an object individually. The target value of each of the control parameters is determined by mediating the demands from each of the control logics with respect to each kind of control parameter. In doing so, the demand from the control logic whose demand has been reflected to the target value in the already-performed mediation is withdrawn or relieved in the following mediation.

6 Claims, 4 Drawing Sheets

100: Input demand value into each mediation unit from each control logic

102: Add up priority of demand with respect to each mediation unit

104: Determine computation order amomg mediation units

106: Perform mediation in mediation unit X

108: Perform withdrawal of demand

110: Mediation computing finished?

VEHICLE CONTROL METHOD AND VEHICLE CONTROL DEVICE

FIELD OF THE INVENTION

The present invention relates to a vehicle control method and vehicle control device.

BACKGROUND ART

An art for determining a final target value of a torque demand for an internal combustion engine of a vehicle is disclosed in Japanese Patent Laid-open No. 2004-52769. According to this art, priority is previously assigned to each torque demand from various torque demand sources, which include drive sliding control, running dynamic characteristic control and the like. The demanded torque is considered according to the priority order, preferably, in the order of the priority from the lowest.

[patent documents 1]

Japanese Patent Laid-Open No. 2004-52769

DISCLOSURE OF THE INVENTION

Problem to be Solved by the Invention

However, in the above prior art, the demanded torque is the only demand output from each torque demand source to the vehicle. In this case, the probability that all of the demands from each of the torque demand sources can be satisfied is extremely low. Because of this, there is a problem that an appropriate target value is not always determined in the standpoint of the vehicle as a whole.

The present invention has been made in view of the above circumstances. An object of the present invention is to provide a vehicle control method and vehicle control device that is capable of achieving the object of each of a plurality of control logics in a balanced manner and performing an appropriate control for the vehicle as a whole.

Means to Solved the Problem

In order to attain the object described above, a first aspect of the present invention is a vehicle control method, comprising:

a demand output step of outputting demands concerning a plurality of control parameters of a vehicle from each of a plurality of control logics having an object individually; and a target value decision step of determining the target value of each of the control parameters by mediating the demands from each of the control logics with respect to each kind of control parameter;

wherein:

in the demand output step, each of the control logic outputs not only the demands concerning each of the control parameters but also information concerning the priority order among the demands; and in the target value decision step, the mediation of the demands from the control logics is performed on the basis of the priority.

A second aspect of the present invention is the vehicle control method according to the first aspect of the present invention, wherein, in the target value decision step, the priority is added up with respect to each kind of control parameter and then the order of performing the mediation among kinds of control parameters is determined on the basis of the result of the adding up.

A third aspect of the present invention is the vehicle control method according to the first or second aspect of the present invention, wherein, in the target value decision step, when the mediation is performed sequentially with respect to each kind of the control parameter, the demand from the control logic whose demand has been reflected to the target value in the already-performed mediation is withdrawn or relieved in the following mediation.

A fourth aspect of the present invention is a vehicle control device, comprising:

a plurality of demand output means which output demands concerning a plurality of control parameters of a vehicle in accordance with individual control logics; and target value decision means which determines the target value of each of the control parameters by mediating the demands from each of the control logics with respect to each kind of control parameter;

wherein:

each of the demand output means outputs not only the demands concerning each of the control parameters but also information concerning the priority order among the demands; and the target value decision means performs the mediation of the demands from the control logics on the basis of the priority.

A fifth aspect of the present invention is the vehicle control device according to the fourth aspect of the present invention, wherein the target value decision means include a mediation order decision means; the mediation order decision means adds up the priority with respect to each kind of control parameter and determines the order of performing the mediation among kinds of control parameters on the basis of the result of the adding up.

A sixth aspect of the present invention is the vehicle control device according to the fourth or fifth aspect of the present invention, wherein the target value decision means, when performing the mediation sequentially with respect to each kind of the control parameter, withdraws or relieves in the following mediation the demand from the control logic whose demand has been reflected to the target value in the already-performed mediation.

EFFECT OF THE INVENTION

According to the first aspect of the present invention, each of the control logics outputs demands concerning each of the control parameters. The demands from each of the control logics are mediated with respect to each kind of control parameter to determine a final target value. This increases opportunities that the demands from each of the control logics can be reflected to the target value of the control parameter. Specifically, as for at least the demand concerning some kind of control parameter among the demands from each of the control logics, the probability of being reflected to the final target value becomes high. When the demand concerning some kind of control parameter is reflected to the target value, the object of the control logic can be achieved to some extent. Therefore, according to the first aspect of the present invention, the object of each of the control logics can be achieved in a balanced manner or satisfied, and an appropriate control can be performed for the vehicle as a whole.

Usually, there exists a control parameter of a kind that is required subsidiarily for the purpose of backup as well as a control parameter of a kind that is required essentially in each of the control logics in order to achieve the object thereof. According to the first aspect of the present invention, the demand concerning each of the control parameters can be prioritized on the basis of whether it is the kind of control parameter that is required essentially or the kind of control parameter that is required as a backup. Because of this, the kind of control parameter that each of the control logics wants to demand essentially can be satisfied preferentially, and a more appropriate control can be performed for the vehicle as a whole.

According to the second aspect of the present invention, the priority output from each of the control logics is added up with respect to each kind of control parameter. This makes it possible to determine which kind of control parameter is important as the kind that is required essentially. Then, by determining the mediation order of each of the control parameters on the basis of the result of the adding up, the demand concerning the kind of control parameter that is required essentially can be satisfied preferentially, and the target value of each of the control parameters can be set more adequately as a whole.

According to the third aspect of the present invention, when the mediation is performed sequentially with respect to each kind of the control parameter, the demand from the control logic whose demand has been reflected to the target value in the already-performed mediation can be withdrawn or relieved in the following mediation. Because of this, in the following mediation, it is possible to increase the probability that the demand from the control logic whose demand has not been reflected to the target value in the already-performed mediation is reflected to the target value. Therefore, the demands from each of the control logics can be satisfied with better balance, and a more appropriate control can be performed for the vehicle as a whole. On the other hand, when all the demands concerning each of the control parameters output from a certain control logic are reflected to the target value, the object of the certain control logic may be achieved excessively. This may cause any negative effect. According to the third aspect of the present invention, such a situation in which a negative effect may be caused due to that only an object of certain control logic is excessively achieved can be surely prevented from arising.

According to the fourth aspect of the present invention, each of the control logics outputs demands concerning each of the control parameters. The demands from each of the control logics are mediated with respect to each kind of control parameter to determine a final target value. This increases opportunities that the demands from each of the control logics can be reflected to the target value of the control parameter. Specifically, as for at least the demand concerning some kind of control parameter among the demands from each of the control logics, the probability of being reflected to the final target value becomes high. When the demand concerning some kind of control parameter is reflected to the target value, the object of the control logic can be achieved to some extent. Therefore, according to the fourth aspect of the present invention, the object of each of the control logics can be achieved in a balanced manner or satisfied, and an appropriate control can be performed for the vehicle as a whole.

Usually, there exists a control parameter of a kind that is required subsidiarily for the purpose of backup as well as a control parameter of a kind that is required essentially in each of the control logics in order to achieve the object thereof. According to the fourth aspect of the present invention, the demand concerning each of the control parameters can be prioritized on the basis of whether it is the kind of control parameter that is required essentially or the kind of control parameter that is required as a backup. Because of this, the kind of control parameter that each of the control logics wants to demand essentially can be satisfied preferentially, and a more appropriate control can be performed for the vehicle as a whole.

According to the fifth aspect of the present invention, the priority output from each of the control logics is added up with respect to each kind of control parameter. This makes it possible to determine which kind of control parameter is important as the kind that is required essentially. Then, by determining the mediation order of each of the control parameters on the basis of the result of the adding up, the demand concerning the kind of control parameter that is required essentially can be satisfied preferentially, and the target value of each of the control parameters can be set more adequately as a whole.

According to the sixth aspect of the present invention, when the mediation is performed sequentially with respect to each kind of the control parameter, the demand from the control logic whose demand has been reflected to the target value in the already-performed mediation can be withdrawn or relieved in the following mediation. Because of this, in the following mediation, it is possible to increase the probability that the demand from the control logic whose demand has not been reflected to the target value in the already-performed mediation is reflected to the target value. Therefore, the demands from each of the control logics can be satisfied with better balance, and a more appropriate control can be performed for the vehicle as a whole. On the other hand, when all the demands concerning each of the control parameters output from a certain single control logic are reflected to the target value, the object of the certain control logic may be achieved excessively. This may cause any negative effect. According to the sixth aspect of the present invention, such a situation in which a negative effect may be caused due to that only an object of certain control logic is excessively achieved can be surely prevented from arising.

DESCRIPTION OF NOTATIONS

10 internal combustion engine

12 intake path

14 exhaust path

18 throttle valve

26 fuel injector

30 spark plug

40 catalyst

42 air-fuel ratio sensor

50 ECU

BEST MODE FOR CARRYING OUT THE INVENTION

First Embodiment

[Description of the System Configuration]

Figure 1:
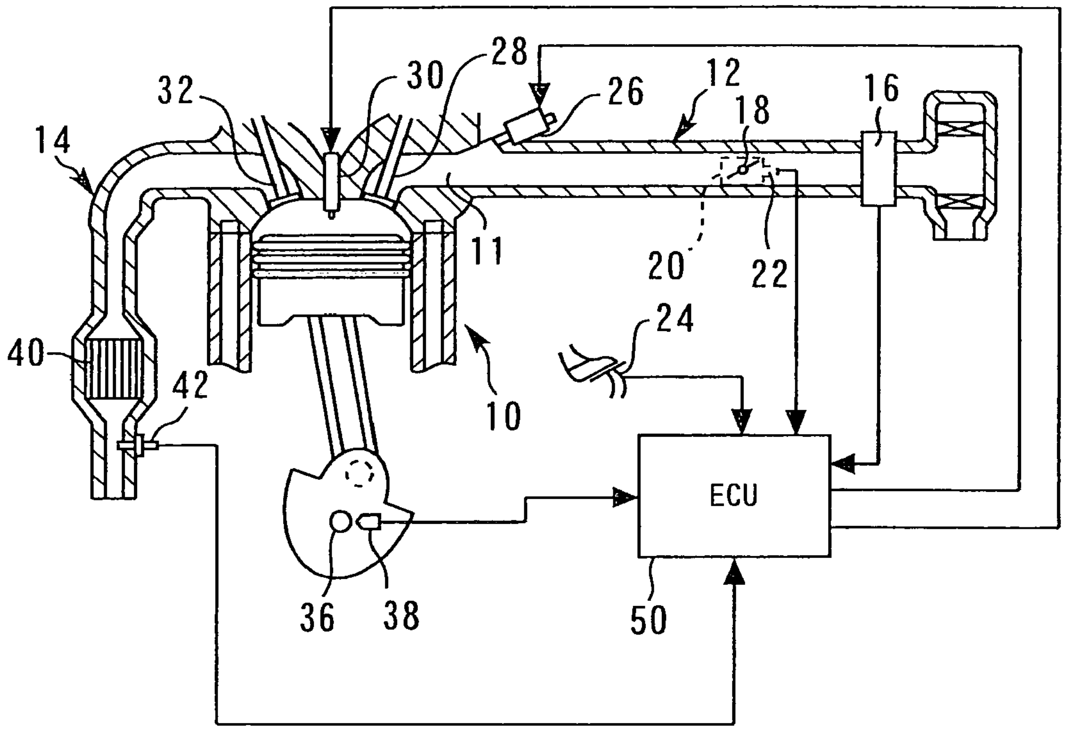
FIG. 1 is an illustration of the system configuration according to a first embodiment of the present invention.

FIG. 1 is an illustration of the system configuration according to a first embodiment of the present invention. As shown in FIG. 1, the system of the present embodiment is provided with an internal combustion engine 10 that is mounted on a vehicle as a power source thereof. Number of cylinders and the cylinder arrangement of the internal combustion engine 10 are not limited in particular.

An intake path 12 and exhaust path 14 are connected to a cylinder of the internal combustion engine 10. An air flow meter 16 to detect intake air amount (GA) is placed at the intake path 12. A throttle valve 18 is arranged downstream of the air flow meter 16. The throttle valve 18 is an electronic controlled valve. For example, the throttle valve 18 is driven by a throttle motor 20 based on an accelerator opening angle. In the vicinity of the throttle valve 18, a throttle position sensor 22 is placed to detect the opening angle of the throttle valve 18. The accelerator opening angle is detected by an accelerator position sensor 24 installed in the vicinity of an accelerator pedal.

A fuel injector 26 to inject fuel in an intake port 11 is placed at the cylinder of the internal combustion engine 10. Note that the internal combustion engine 10 is not limited to a thing of the port injection type such as the illustration. The direct injection type injecting fuel in the cylinder directly may be used. The combination of the port injection and direct injection may be used too. An intake valve 28, a spark plug 30 and an exhaust valve 32 are further installed in the cylinder of the internal combustion engine 10.

A crank angle sensor 38 to detect a rotation angle of a crank shaft 36 is attached in the vicinity of the crank shaft 36 of the internal combustion engine 10. From an output of the crank angle sensor 38, the rotation position of the crank shaft 36 or engine rotation speed (NE) can be detected.

A catalyst 40 to purify exhaust gas is installed in the exhaust path 14 of the internal combustion engine 10. The type of the catalyst 40 is not limited in particular. Whatever type of catalyst, for example, a three-way component catalyst, occlusion reduction type NOx catalyst, NOx selection and reduction catalyst, oxidation catalyst and the like may be used. In addition, another catalyst may be placed upstream or downstream of the catalyst 40.

An air-fuel ratio sensor 42 to detect an air-fuel ratio of the exhaust gas is installed in the exhaust path 14 downstream of the catalyst 40. The air-fuel ratio sensor 42 may be installed upstream of the catalyst 40.

The system of the present embodiment is further provided with an ECU (Electronic Control Unit) 50. Various sensors and actuator described above are connected to the ECU 50. The ECU 50 controls the internal combustion engine 10 based on the outputs from those sensors.

[Characteristic of First Embodiment]

Figure 2:
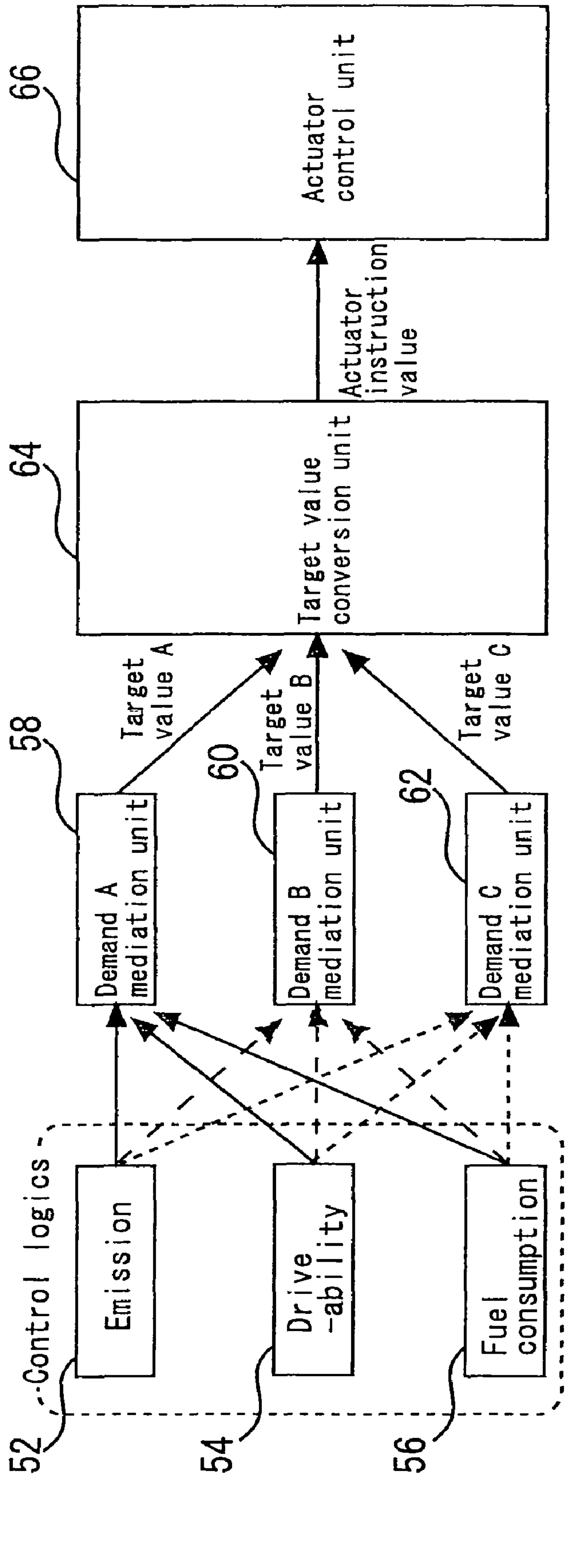
FIG. 2 is a functional block diagram of an ECU according to the first embodiment of the present invention.

FIG. 2 is a functional block diagram of the ECU 50. The ECU 50 has a plurality of control logics. Each of the control logics outputs demands based on the individual standpoint or object. In the present embodiment, as shown in FIG. 2, the ECU 50 has an emission control logic 52 outputting demands for emission reduction, a drive-ability control logic 54 outputting demands for good drive-ability and a fuel consumption control logic 56 outputting demands for fuel consumption reduction.

In the present embodiment, each of the control logics 52, 54, 56 outputs demands concerning each of three control parameters of the vehicle. For example, the control parameters are torque, air-fuel ratio (A/F) and efficiency (η) of the internal combustion engine 10. But the control parameters are not limited to these. Note that, in the present specification, the efficiency (η) is defined as a proportion of generated torque to the torque that will be obtained if ignition timing is set at the MBT (Minimum advance for the Best Torque). Thus, when ignition timing is set at the MBT, the efficiency (η) becomes 1.And the larger the retard amount of ignition timing with respect to the MBT, the smaller the efficiency (η) becomes.

In the following description, the above-described three control parameters are distinguished as "A", "B", "C". The demand concerning control parameter A is referred to as "demand A". The demand concerning control parameter B is referred to as "demand B". And the demand concerning control parameter C is referred to as "demand C".

Note that the present invention is not limited to the above-mentioned configuration. Each of the control logic may be realized by separate ECU.

As shown in FIG. 2, the ECU 50 is further provided with a demand A mediation unit 58, demand B mediation unit 60, demand C mediation unit 62, target value conversion unit 64 and actuator control unit 66.

The demand A mediation unit 58 gathers and mediates the demands A output from each of the control logics 52, 54, 56 to determine the final target value of the control parameter A (hereinafter referred to as "target value A"). In a similar way, the demand B mediation unit 60 gathers and mediates the demands B output from each of the control logics 52, 54, 56 to determine the final target value of the control parameter B (hereinafter referred to as "target value B"). The demand C mediation unit 62 gathers and mediates the demands C output from each of the control logics 52, 54, 56 to determine the final target value of the control parameter C (hereinafter referred to as "target value C"). The method for mediating these demands will be descried later.

The target value conversion unit 64 converts the target value A, target value B and target value C, which are computed in the demand A mediation unit 58, demand B mediation unit 60 and demand C mediation unit 62 respectively, into actuator instruction values that are necessary for the fulfillment of those target values. For example, these actuator instruction values include an injection quantity from the fuel injector 26, opening angle of the throttle valve 18, ignition timing and the like.

The actuator control unit 66 controls the operation of the actuators, which include the fuel injector 26, throttle valve 18, spark plug 30 and the like, in order to realize the actuator instruction values computed by the target value conversion unit 64.

Figure 3:
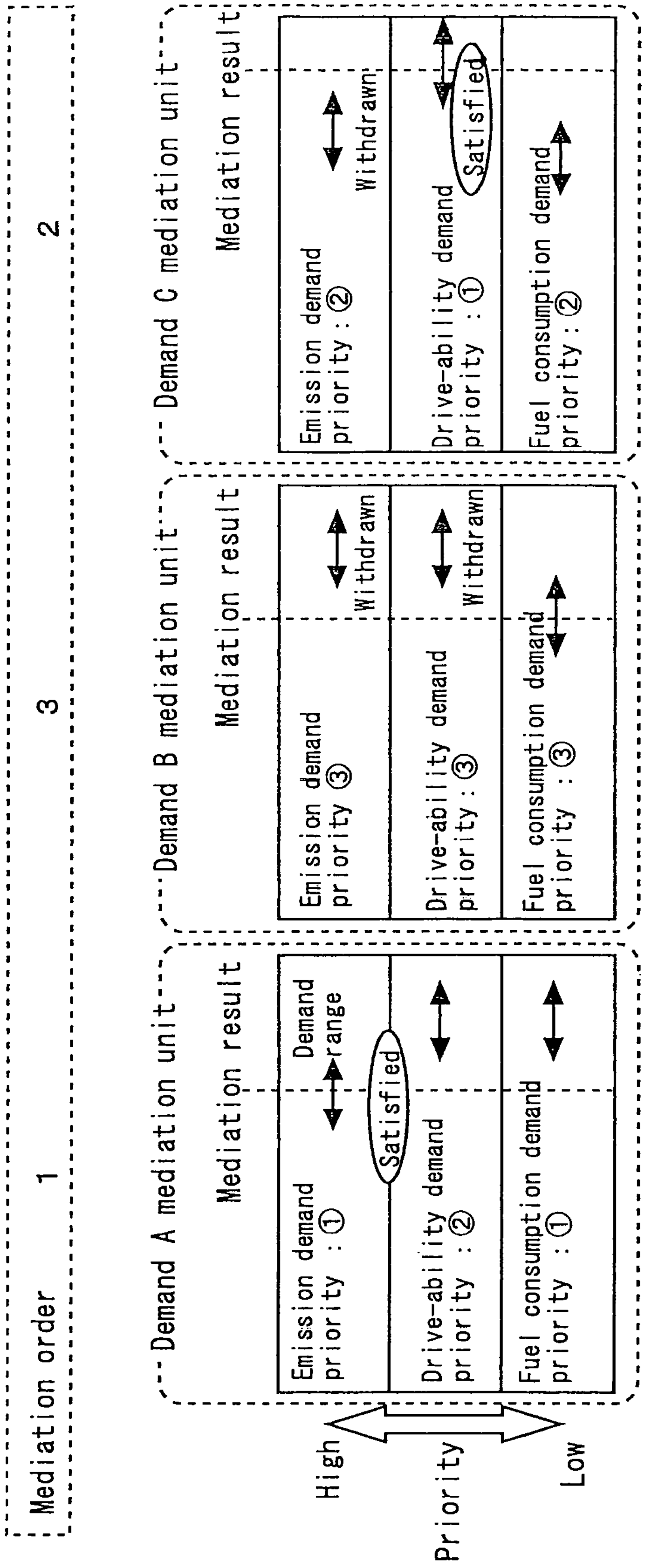
FIG. 3 is an illustration to explain a demand mediation method according to the first embodiment of the present invention.
Figure 4:
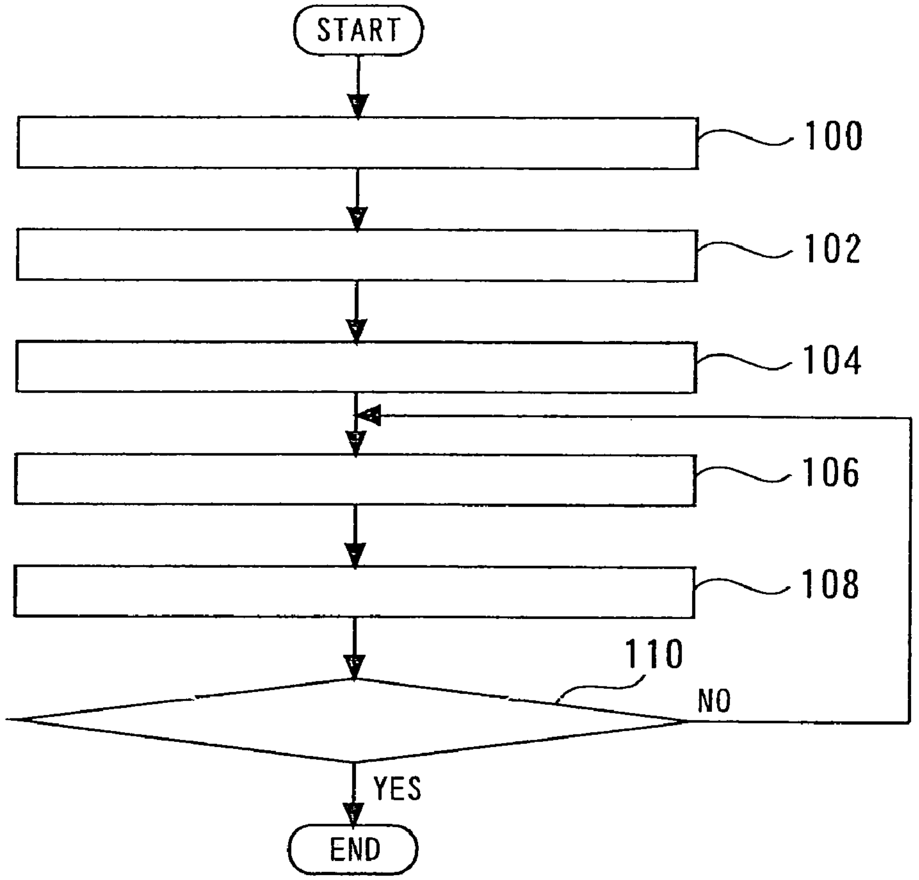
FIG. 4 is a flowchart of a routine that is executed in the first embodiment of the present invention.

FIG. 3 is an illustration to explain a demand mediation method in the present embodiment. In the present embodiment, each of the control logics 52, 54, 56 are adapted to output the demand A, demand B and demand C with a priority order (specifically, an order of priority for fulfillment) among those demands. In the example shown in FIG. 3, the emission control logic 52 sets the demand A to the first-order priority, sets the demand C to the second-order priority and sets the demand B to the third-order priority. On the other hand, the drive-ability control logic 54 sets the demand C to the first-order priority, sets the demand A to the second-order priority and sets the demand B to the third-order priority. The fuel consumption control logic 56 sets the demand A to the first-order priority, sets the demand C to the second-order priority and sets the demand B to the third-order priority.

In the present embodiment, the above-described priority is added up with respect to each demand. And then, the mediation among the demands A, B or C is performed on the basis of the result of the adding up. In the example shown in FIG. 3, the priority of the demand A is set to the first-order in the emission control logic 52, set to the second-order in the drive-ability control logic 54 and set to the first-order in the fuel consumption control logic 56. Therefore, regarding the demand A, the result of the adding up becomes 4 (that is 1+2+1=4). Similarly, the priority of the demand B is set to the third-order in the emission control logic 52, set to the third-order in the drive-ability control logic 54 and set to the third-order in the fuel consumption control logic 56. Therefore, regarding the demand B, the result of the adding up becomes 9 (that is 3+3+3=9). Besides, the priority of the demand C is set to the second-order in the emission control logic 52, set to the first-order in the drive-ability control logic 54 and set to the second-order in the fuel consumption control logic 56. Therefore, regarding the demand C, the result of the adding up becomes 5 (that is 2+1+2=5). Thus, the mediation of this case is performed in ascending order of the result of the adding up, that is, in order of demand A, demand C, demand B.

Besides, in the present embodiment, priority is set for each of the control logics 52, 54, 56. In the example shown in FIG. 3, the priority is given so as to be higher in order of the emission control logic 52, the drive-ability control logic 54, and the fuel consumption control logic 56.

The priority of each of the control logics 52, 54, 56 and the priority order among the demand A, demand B and demand C which are output from each of the control logics 52, 54, 56 are set or changed in response to an operating state of the internal combustion engine 10 or a driving phase (for example, catalyst warming up phase, fuel consumption precedence phase, torque precedence phase or the like).

In the present embodiment, each of the demands A, B, C is output in the form of demand range about the value of each of the control parameters A, B, C (in other words, demanded value range). In FIG. 3, the horizontal axis presents each of the demands A, B, C and each sideway directional arrow presents the demand range.

When there is an overlap among the demands from each of the control logics 52, 54, 56, each of the demand mediation units 58, 60, 62 determines a target value, i.e., a result of the mediation within the overlap. When there is no overlap, each of the demand mediation units 58, 60, 62 determines the target value that is the result of the mediation within the demand range from a control logic having the highest priority. Following is a concrete explanation about the case example shown in FIG. 3.

At first, in the demand A mediation unit 58 which is the first in the mediation order, the mediation processing is performed as follows. In the example shown in FIG. 3, there is no overlap among the demand A from the emission control logic 52, demand A from the drive-ability control logic 54 and demand A from the fuel consumption control logic 56. Therefore, the target value A that is the result of the mediation is determined on the basis of the range of the demand A from the emission control logic 52 which has the highest priority (see dotted line in FIG. 3).

After the mediation for demand A is performed in this way, the next mediation is performed sequentially in order of demand C, demand B as according to the above-described mediation order. In doing so, in the present embodiment, the demand from the control logic whose demand has been reflected to the target value in the already-performed mediation is withdrawn or relieved in the following mediation.

In the case example shown in FIG. 3, the demands C and B from the emission control logic 52 are considered to have been withdrawn in the following mediations for the demand C and for the demand B because the demand A output from the emission control logic 52 has been reflected to the mediation result (the target value A) in the mediation for the demand A.

Therefore, in the demand C mediation unit 62 which is the second in the mediation order, the mediation processing is performed as follows. In this mediation processing, the demand C from the emission control logic 52 is considered to have been withdrawn as mentioned above and not taken into consideration. Further, in the example shown in FIG. 3, there is no overlap between the demand C from the drive-ability control logic 54 and the demand C from the fuel consumption control logic 56. Therefore, the target value C that is the result of the mediation is determined on the basis of the range of the demand C from the drive-ability control logic 54 which has a higher priority (see dotted line in FIG. 3).

In this way, because, the demand C from the drive-ability control logic 54 has been reflected to the mediation result (the target value C) in the mediation for demand C, the demand B from the drive-ability control logic 54 is considered to have been withdrawn in the following mediation for demand B.

Therefore, in the demand B mediation unit 60, the mediation processing is performed as follows. As mentioned above, the demand B from the emission control logic 52 and the demand B from the drive-ability control logic 52 are considered to have been withdrawn and not taken into consideration. Accordingly, only the demand B from the fuel consumption logic 56 is taken into consideration. Therefore, the target value B that is the result of the mediation is determined on the basis of the range of the demand B from the fuel consumption logic 56 (see dotted line in FIG. 3).

[Concrete Processing Performed in First Embodiment]

FIG. 5 is a flowchart of a routine that is executed by the ECU 50 in the present embodiment in order to realize the above-described functions. At first, according to the routine shown in FIG. 5, the demands A, B, C are input with the information concerning the priority order among them from each of the control logics 52, 54, 56 to each of the demand mediation units 58, 60, 62 (step 100).

Next, the priority is added up with respect to each of the demand mediation units 58, 60, 62 (step 102). And then, the order of performing the mediation among the demand mediation units 58, 60, 62 is determined on the basis of the result of the adding up (step 104).

Subsequently, in accordance with the mediation order of above step 104, the mediation is performed in the demand mediation unit which has the highest priority in the mediation order among demand mediation units where the mediation has not been performed yet (step 106). In Next processing (step 108), the demand from the control logic whose demand has been reflected to the target value in the mediation performed in step 106 is withdrawn in the following mediation.

Following the processing of above step 108, it is determined whether there is a demand mediation unit where the mediation has not been performed yet (step 110). When there is a demand mediation unit where the mediation has not been performed yet, the processing of and after the above step 106 is performed again. On the other hand, when it is determined that the mediation has been finished in all the demand mediation units, the processing of this routine is finished.

According to the present embodiment descried above, each of the control logics 52, 54, 56 outputs demands concerning each of the control parameters A, B, C. The demands from each of the control logics 52, 54, 56 are mediated with respect to each of the control parameters A, B, C to determine the target values A, B, C. This increases opportunities that the demands from each of the control logics 52, 54, 56 can be reflected to the target value of each of the control parameters A, B, C. Specifically, as for at least one of the demands A, B, C from each of the control logics 52, 54, 56, the probability of being reflected to the final target value becomes high. When at least one of the demands A, B, C is reflected to the target value, the object of the control logic can be achieved to some extent. Therefore, according to the present embodiment, the object of each of the control logics 52, 54, 56 can be achieved in a balanced manner or satisfied, and an appropriate control can be performed for the vehicle as a whole.

Usually, there exists a control parameter of a kind that is required subsidiarily for the purpose of backup as well as a control parameter of a kind that is required essentially in each of the control logics 52, 54, 56 in order to achieve the object thereof. According to the present embodiment, each of the control logics 52, 54, 56 can prioritize the demands A, B, C on the basis of whether it is the kind of control parameter that is required essentially or the kind of control parameter that is required as a backup. Because of this, the kind of control parameter that each of the control logics 52, 54, 56 wants to demand essentially can be satisfied preferentially, and a more appropriate control can be performed for the vehicle as a whole.

Further, according to the present embodiment, the priority output from each of the control logics 52, 54, 56 is added up with respect to each of the demands A, B, C. This makes it possible to determine which kind of control parameter is important as the kind that is required essentially. Then, by determining the mediation order of each of the control parameters A, B, C on the basis of the result of the adding up, the demand concerning the kind of control parameter that is required essentially can be satisfied preferentially, and the target value of each of the control parameters A, B, C can be set more adequately as a whole.

Furthermore, according to the present embodiment, when the mediation is performed sequentially with respect to each of the control parameters A, B, C, the demand from the control logic whose demand has been reflected to the target value in the already-performed mediation can be withdrawn in the following mediation. Because of this, in the following mediation, it is possible to increase the probability that the demand from the control logic whose demand has not been reflected to the target value in the already-performed mediation is reflected to the target value. Therefore, the demands from each of the control logics 52, 54, 56 can be satisfied with better balance, and a more appropriate control can be performed for the vehicle as a whole. On the other hand, when all the demands concerning each of the control parameters A, B, C output from a certain single control logic are reflected to the target value, the object of the certain control logic may be achieved excessively. This may cause a negative effect. According to the present embodiment, such a situation in which a negative effect may be caused due to that only an object of certain control logic is excessively achieved can be surely prevented from arising.

Meanwhile, in the first embodiment described above, the case that the present invention is applied to the control of the internal combustion engine 10 of the vehicle is described. However, the present invention can be applied to various kind of control amount that should be controlled on the vehicle, for example, the torque of the driving wheel of the vehicle.

Besides, the first embodiment described above assumes that the demand from the control logic whose demand has been reflected to the target value in the already-performed mediation is withdrawn in the following mediation. However, in this case, the present invention allows the demand to be relieved instead of being completely withdrawn. For example, the demand range may be broadened.

Additionally, in the first embodiment described above, the emission control logic 52, drive-ability control logic 54 and fuel consumption control logic 56 are equivalent to the "demand output means" according to the fourth aspect of the present invention. And the "target value decision means" according to the fourth aspect of the present invention is implemented when the ECU 50 executes the processing in steps 102 to 110 described above. The "mediation order decision means" according to the fifth aspect of the present invention is implemented when the ECU 50 executes the processing in steps 102 and 104 described above.

The invention claimed is:

1. A vehicle control method, comprising:

a demand output step of outputting demands concerning a plurality of control parameters of a vehicle from each of a plurality of control logics having an object individually, each of the demands being expressed in values to realize the control parameters (hereinafter referred to as demanded values) and priorities of realization among the control parameters;

a target value decision step of classifying the demanded values outputted from each of the control logics according to control parameter type and determining a target value of each of the control parameters by mediating the classified demanded values according to rules set up for each control parameter type; and a mediation rule decision step of determining the mediation rule of each control parameter type based on the demand priorities among the control parameters outputted from each of the control logics.

2. The vehicle control method according to claim 1, wherein, in the mediation rule decision step, the priorities are totaled for each control parameter type, execution sequence of mediation among the control parameter types is determined based on the totaled result and the mediation rule of each control parameter type is determined in accordance with the execution order of mediation determined for each control parameter type.

3. The vehicle control method according to claim 2, wherein, in the mediation rule decision step, when a demand from a certain control logic is reflected to a target value of a certain control parameter by mediation, the mediation rule of each control parameter type is determined so that the demand from the certain control logic is withdrawn or relieved in the mediation executed for the remaining control parameter of which a target value is not determined.

4. A vehicle control device, comprising:

a plurality of demand output means which output demands concerning a plurality of control parameters of a vehicle in accordance with individual control logics, each of the demands being expressed in values to realize the control parameters (hereinafter referred to as demanded values) and priorities of realization among the control parameters;

target value decision means which classifies the demanded values outputted from each of the demand output means according to control parameter type and determines a target value of each of the control parameters by mediating the classified demanded values according to rules set up for each control parameter type; and mediation rule decision means which determines the mediation rule of each control parameter type based on the demand priorities among the control parameters outputted from each of the demand output means.

5. The vehicle control device according to claim 4, wherein the mediation rule decision means totals the priorities for each control parameter type, determines execution sequence of mediation among the control parameter types based on the totaled result and determines the mediation rule of each control parameter type in accordance with the execution order of mediation determined for each control parameter type.

6. The vehicle control device according to claim 5, wherein, when a demand from a certain demand output means is reflected to a target value of a certain control parameter by mediation, the mediation rule decision means determines the mediation rule of each control parameter type so that the demand from the certain demand output means is withdrawn or relieved in the mediation executed for the remaining control parameter of which a target value is not determined.

* * * * *